C. RUSSELL.
ROOFING.
APPLICATION FILED APR. 8, 1914.
Reissued Feb. 8, 1916. 14,058.
FIG. 1.
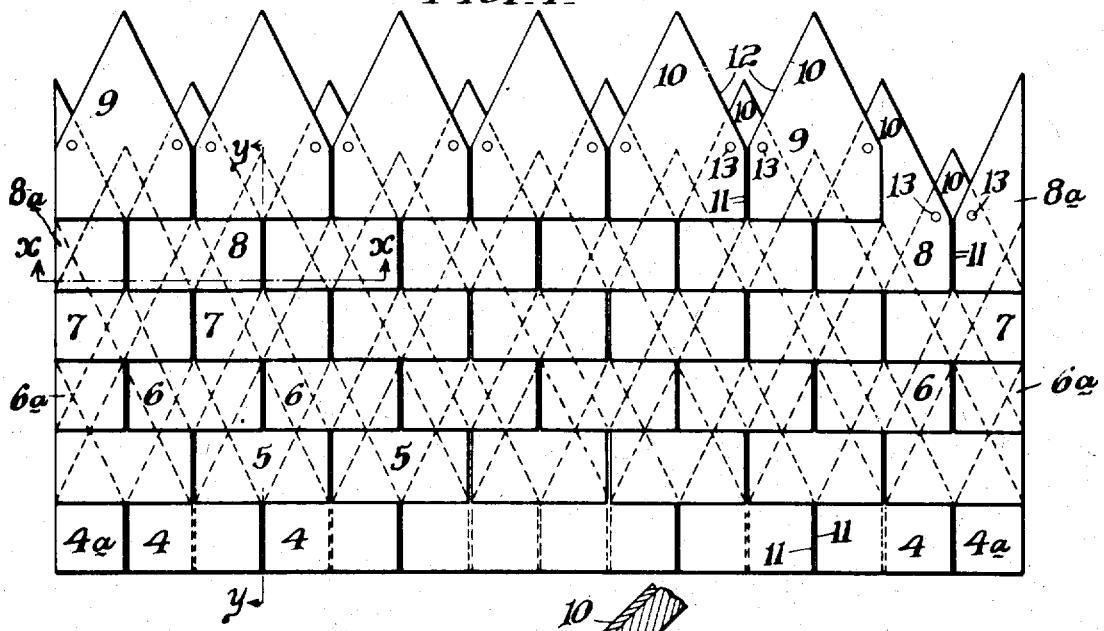
FIG. 4.
FIG. 2.
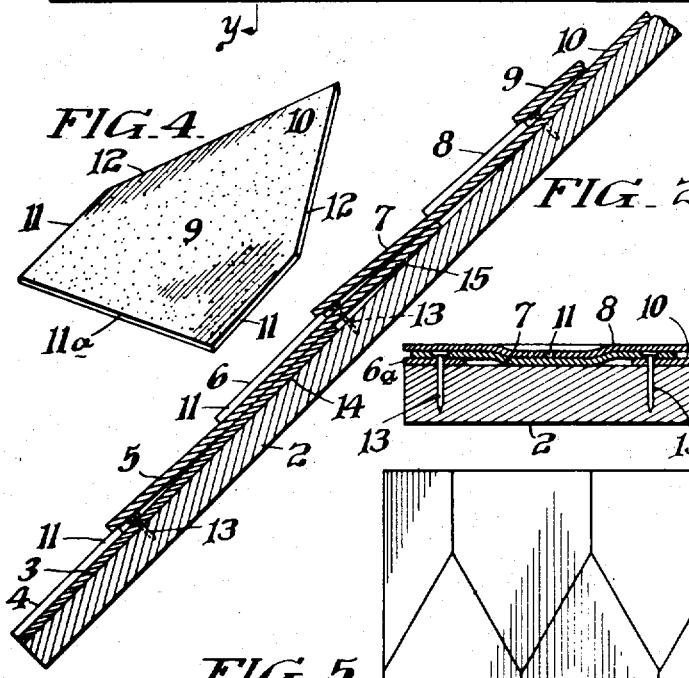
FIG. 3.
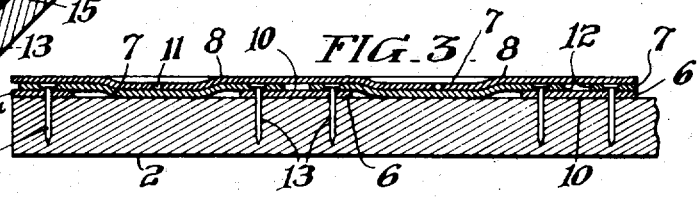
FIG. 5.
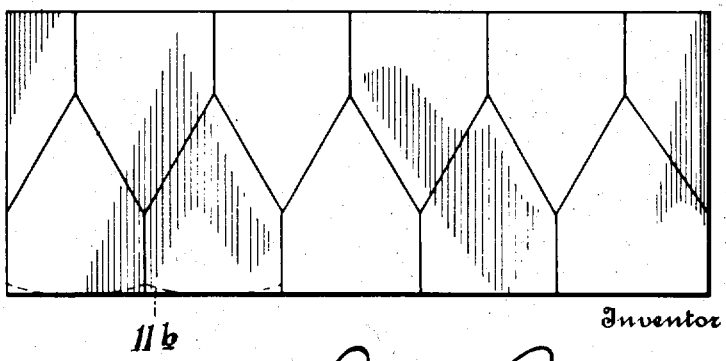
Inventor
Calvin Russell
Witnesses
Daniel Webster, Jr.
E. W. Smith
By
Attorney

UNITED STATES PATENT OFFICE.

CALVIN RUSSELL, OF PENN YAN, NEW YORK, ASSIGNOR TO CARRIE H. RUSSELL, OF PENN YAN, NEW YORK.

ROOFING.

14,058. Specification of Reissued Letters Patent. Reissued Feb. 8, 1916.

Original No. 1,070,738, dated August 19, 1913, Serial No. 757,069. Application for reissue filed April 8, 1914. Serial No. 830,549.

*To all whom it may concern:*

Be it known that I, CALVIN RUSSELL, a citizen of the United States, and resident of Penn Yan, county of Yates, and State of New York, have invented an Improvement in Roofing, of which the following is a specification.

The object of my invention is to provide roof covering of felt paper shingles embodying such shape and such correlation in use, that not only is a very tight or waterproof roof provided, but the same is secured at a low cost both as to raw shingle material and for erection expenses.

My improved shingles are cut from sheets of felt paper preferably impregnated with a compound such as asphaltum and to the outer surface of which is preferably applied vitreous material such as sand or crushed slate or granite to give to it a degree of fire-proofedness and more durability against inclement weather than the impregnated paper alone would provide; the said shingles, in their preferred form, being five-sided, in which the three lower edges form a rectangular body from the upper edges of which the remaining two edges extend upward and toward each other to form an inverted V, the most advantageous length of this pointed upper end being approximately twice the length of the lower or rectangular body. Shingles of these proportions may be cut from sheet material with very great economy as to area of material required to cover a given roof surface and while this is the primary object where a roof must combine cheapness with non-leaky quality, nevertheless the general construction of the shingles and their combination in associated relation as a roof covering permits of the shingles being varied in proportion and arrangement, while maintaining their special qualities due to their structure and interlocking association when applied to the roof. For roofs, where artistic design is desired, the rectangular or body part may be modified.

More generally considered, my improved shingle may be defined as one formed of a pliable felt paper body impregnated with a hydrocarbon material such as asphaltum, pointed at one end and with the opposite end otherwise shaped, said shingle adapted to bend and set to interlock with adjacent shingles when in place on the roof.

My invention further consists of a roof covering of the shingles above described when overlapped vertically and laterally, the seams being staggered in adjacent rows and in alinement with the direction of greatest length in the pointed ends of the shingles of the next lower row, the said shingles in use being bent or set on curves both in the direction of their length and width so as to fit snugly upon each other and form close seams.

My invention also comprehends details of construction which, together with the features above specified, will be better understood by reference to the drawings, in which:—

Figure 1 is a plan view looking down upon a roof covering embodying my improvements, with the shingles applied so as to show their construction and mode of application; Fig. 2 is a vertical cross section on line *y—y* of Fig. 1; Fig. 3 is a transverse section on line *x—x* of Fig. 1; Fig. 4 is a perspective view of one of the shingles; and Fig. 5 is a plan view of a sheet of prepared felt paper showing how my improved shingles may be economically cut so as to provide the greatest number of shingles from a given area of sheet.

The shape of the most economical form of shingle having a rectangular portion is best shown in Fig. 4, in which 9 is the body, having approximately one-third of the height with a straight transverse lower edge 11[a] and two side edges 11 at right angles to the said bottom edge, and having the remaining approximately two-thirds of the height formed in a pointed shape indicated at 10 by the two inclined edges 12 meeting at the apex, said edges having their lower ends respectively joining with the parallel side edges 11. The material of which this shingle is formed is what is known as felt paper, and preferably of a wool felt composition, impregnated with asphaltum or other hydrocarbon and preferably covered on one of its surfaces with sand or crushed vitreous material, such as slate, indicated by the dotted portion in Fig. 4. The sand or other vitreous coating adheres to the felt paper by the presence of the asphaltum. The shingles of this shape are cut from a sheet of the prepared felt paper material in the manner indicated in Fig. 5, said sheets being of any desired length, the beginning and ending of such cutting providing half shingles corresponding to the end shingles, $4^a$, $6^a$, $8^a$, of Fig. 1, the same being necessary for filling out the ends of every alternate horizontal row at each end, though it is evident that whether said half shingles come upon one or both ends of any row, will depend upon the relative width of the shingles and length of the roof; and manifestly these shingles may be cut to fit any roof.

Shingles of the character above described, when used in place of rectangular shingles as a covering for a roof, and when laid in substantially the manner indicated in Fig. 1, the projecting or exposed portions 4, 5, 6, 7 and 8 will have all the appearance of the ordinary rectangular shingles, so that the general appearance of the roof in its finished condition will be precisely the same; but the actual construction with respect to the concealed portions is materially different, as is also the surface in respect to the fact that the pliability of the material permits it to set inwardly in more or less curved portions to conform to the underlying structure.

Referring more particularly to the illustrations, 2 represents the ordinary framing of the roofing and may be of any suitable kind or character such as employed for shingle roofs. At the lower or eaves portion of the roof, there is a double layer of shingles 3 and 4, placed one upon the other, but with the joints 11 staggered. The ends of either or both of these layers of shingles are finished with the half shingles such as $4^a$. These shingles are nailed together and to the roofing boards by nails 13. The juncture of the inclined edges 12 of adjacent shingles where they meet the narrow groove formed between the shingles by the edges 11, constitutes a definite line of points transversely along the length of the roof, and which act as a guide to the roofer in laying the next layer of shingles 5 upon the upper layer 4 of the lower shingles. This same operation is repeated with each layer of shingles 6, 7, 8, 9, etc. It is, however, to be understood that in laying each successive row of shingles, the joints between the shingles are staggered with respect to the shingles in the next preceding row, so that the joints of all the rows are relatively staggered with those of adjacent rows.

Heretofore it has always been necessary in using rectangular shingles to draw a chalk line lengthwise of the roof at the proper number of inches from the lower edge of the last laid row of shingles to act as a guide line in laying the next row or line of shingles above. This has to be repeated with every row of shingles. This is not only tedious but is costly as taking up considerable time of the roofer which could be more profitably employed in applying the roofing shingles, and as it is done in the case of my improved shingles. In laying the successive rows of shingles embodying my improvements, the lower straight edge of the shingle is positioned so as to just come below the juncture of the side edges 11 and 12 of the adjacent shingles, as will be clearly understood by reference to Fig. 1, and in this way there is no difficulty whatever in applying the shingles with absolute regularity.

It will further be seen that the narrow channel formed by the adjacent edges 11 of the shingles of any row comes exactly in vertical alinement with the point of the shingle immediately below this channel, so that the greatest length of the portion 10 of said shingle is in direct line with the alinement of the groove, so that if there is any tendency of water to blow upward through the groove, it will be guided in the direction of the greatest length of roofing shingle. Furthermore, the parallelism of the edges 11, providing a long narrow channel between the adjacent shingles, will insure any tendency of upward blasts to be guided in straight direction toward the point of the shingle below and not laterally along the edges 12 of the upper shingles. It will also be seen that the nails 13, being driven through the body of the shingles a little above and to each side of the channel formed by the edges 11, firmly bind the edges 12 of the superimposed shingles tightly upon the ends 10 of the under shingles, so that any water that might be driven upward upon this end 10 cannot work laterally between the shingles but must find its way downward and out to the same channel. As these shingles are of pliable material which, under the pressure of the nails, as well as under their own weight when subjected to the heat of the sun, will bend or change their shape, they set very closely upon each other and in between the successive points 10 of adjacent shingles in the same row, as is clearly indicated in Fig. 3, wherein it will be seen that the body of the shingle 7 bends down and rests upon the roofing boards in the space intermediate of the upper ends 10 of the shingles 6, 6; and likewise, the lateral edges of the upper shingles 8 bend downward to fit the depressed portions of the body of the shingle 7. This produces an interlocking of the parts which gives to the roofing structure as a whole, a very solid and rigid construction. Moreover, the curvature of these lateral edges of the shingles 8, Fig. 3, is such that if the wind is blowing transversely over the roof, it will be guided above the vertical grooves formed by the edges 11 of adjacent shingles, and in that manner prevent the full action of the wind in backing up water into the said grooves. By reference to Fig. 2, it will be seen that the points 10 of each shingle are brought down positively upon the roofing boards, and that the body of the next shingle above is held tightly to this point, as indicated at 15, and as the others of the upper shingles bend laterally over the point, as before explained, it is seen that the points and body are very rigidly held against shifting and consequently the fewest number of nails possible are required to firmly secure these shingles to the roof. After the roofing has been in use for some time and the action of the sun's heat, coupled with the weight of the saturated felt paper and covering, have become effective, the shingles will set into a close compact mass in which the contacting surfaces will be more or less cemented by the asphaltum or other hydrocarbon compound which may be used to impregnate the shingle. As before stated, the rows of shingles would require the use of more or less of the half shingle portions, such as $4^a$, $6^a$, $8^a$, to finish off the end edges of the roof. It is manifest that if the roof were only as long as to extend to the last half shingle shown in Fig. 1 at the right-hand end, then in that event, there would be a half shingle construction on each of the rows 5 and 7, as well as on the rows 4, 6 and 8, but this is a mere matter of architecture in proportioning the size of the roof.

By employing two rows of shingles superimposed for the lower edge of the roofing covering, great strength is here provided, and at the same time, the joints of the lower shingles are made water-tight, but it will be observed by reference to Fig. 2 that the greatest number of shingles superimposed would be three, namely at that place coming under the shingles of the row 6. At all other places on the roof above this place, there are only two shingles superimposed above each other, except at the edges adjacent to the nails. Where rectangular shingles are employed, the shingles would be four-ply instead of three-ply adjacent to the third row of shingles (corresponding to shingle 6), and at all other places, the roof would be three-ply without any benefits whatever.

A most important advantage of my improved roofing over the roof coverings employing rectangular shingles, is that aside from the greater strength and economy in the construction of the shingles and from the facility with which they may be applied and alined, my roofing may be made approximately forty per cent. lighter than the roofing formed with the rectangular shingles, and this is most important in that it permits a much lighter roofing foundation, which aside from cheapness does not overload the framing of the house.

Heretofore, as before stated, shingles of the material of which my shingles are composed, have been made in rectangular form, and aside from the fact that such shingles require thirty-seven and three-quarter per cent. more material to cover the same area of roof than is required by my improved shingles, the cost for packing and freight is also reduced approximately one-third, so that it may be reasonably asserted that the use of my improvements secures a saving of at least forty per cent. of the cost of covering the same roof with rectangular shingles and at the same time provide a better covering.

I have shown the shingle as applied to the roof of the form that I prefer in practice for most economical results, namely, one in which the triangular portion is approximately two-thirds of the length of the shingle and the rectangular portion approximately one-third of the length of the shingle, but the width may be varied somewhat from what is shown, if so desired, and while I have preferred to have the lower edge of the shingles $11^a$ straight for obvious reasons, it is nevertheless evident that the lower edges of these shingles might be trimmed for ornamentation to give them an irregular form as indicated, by way of example, at $11^b$ in Fig. 5, such modification being for ornamentation and in no way affecting or varying the construction in its general characteristics or its function in operation in the completed roof. Therefore, in using the words "rectangular portion of the body," I have not used it in exact sense, but as indicating that portion of the shingle embraced between the opposite parallel side edges 11 and which portion may approximate about one-third of the total height of the shingle. Any variations of the lower edge for purposes of ornamentation are understood as being permissible under the general definition of the "rectangular lower portion" of the shingle structure, without departing from the spirit of the invention, and I therefore do not limit myself to any restriction in this respect, which may be employed by way of ornamentation.

While I have shown my improved shingles applied in the manner I prefer to apply them in practice, for the purpose of the greatest economy, it will be understood that the shingles may be nailed upon the roof foundation in any convenient way found most desirable or to suit the wishes of the builder. It is also manifest that, while describing my invention in its form for securing the greatest economies, I do not wish to restrict myself to the proportions herein set out by way of example; for instance, I may vary the sharpness or degree of the pointing, but by so doing, some of the economy possible to be derived from my invention would be lost. For illustration, if we assume that with a given length of shingle the zig-zag cutting of the sheet was made with the points of 90 degrees instead of approximately 60 degrees, as illustrated in the example shown in Fig. 5, it is manifest that a somewhat greater width of sheet from which the two rows of shingles are to be cut would be required and, to this extent, the possible economy would be reduced, but it is manifest that such change in the sharpness or length of the pointing would nevertheless embody to a greater or lesser degree the essential characteristic features of my improved shingle, and I therefore do not restrict myself to the proportions which I have shown by way of example of the most economical proportions. I also desire it to be understood that, in designating the parts 10, 12, as "points" or "pointed shape," I do not wish to be restricted to angular points precisely of the form shown, as the sharpness of the point is not at all material. These "points" may be blunter if so desired, since the particular angularity of the edges 12 or said edges being straight, is not at all essential, as the same general result would be accomplished with the type of zig-zag or sinuous cutting of Fig. 5; therefore such minor details are not to be understood as limitations of my invention.

Having now described my invention, what I claim as new and desire to secure by Letters Patent, is:—

1. As an improved article of manufacture, a roofing shingle consisting of a body having approximately one third of its length made of general rectangular form in plan and the remaining approximately two-thirds of its length made of triangular form in plan, said body composed of an integral felt sheet material impregnated with hydrocarbon composition.

2. In a roof, the combination of a suitable foundation, with a plurality of horizontal rows of shingles each composed of pliable sheet fibrous material of uniform thickness impregnated with hydrocarbon compound and having a portion of its length of general rectangular form with parallel side edges and the remaining portion of the length substantially in triangular form, said shingles arranged side by side in overlapping rows and in close surface contact with the shingles of the next under adjacent row and with the vertical juncture spaces between the shingles of the adjacent rows in staggered relation and in vertical alinement with the pointed upper ends of the underlying shingles, and the lower edges of the approximately rectangular portions being extended over the upper edges of the parallel side edges and so as to cover the space between adjacent triangular portions of the shingles in the next adjacent row below and the upper ends of the shingles bent out of alinement with the lower portions so as to interlock with adjacent side and under shingles.

3. In a roof, the combination of a suitable foundation, with a plurality of horizontal rows of shingles each composed of pliable fibrous material impregnated with hydrocarbon compound and having a portion of its length of general rectangular form with parallel side edges and the remaining portion of the length in triangular form, said shingles arranged side by side in overlapping rows and with the vertical juncture spaces between the shingles of the adjacent rows in staggered relation and in vertical alinement with the pointed upper ends of the underlying shingles, and the lower edges of the approximately rectangular portions being extended over the upper edges of the parallel side edges and so as to cover the space between adjacent triangular portions of the shingles in the next adjacent row below, and nails extending through the two overlapping rows of shingles and between the upper ends of the shingles of the second removed row below said nails passing through the lower side parts of the triangular portions of the shingles of one row and the upper or point ends of the shingles of the next row below.

4. In a roof, the combination of a suitable foundation, with a plurality of horizontal rows of shingles each composed of pliable fibrous material impregnated with hydrocarbon compound and having a portion of its length of general rectangular form with parallel side edges and the remaining portion of the length in triangular form, said shingles arranged side by side in overlapping rows and with the vertical juncture spaces between the shingles of the adjacent rows in staggered relation and in vertical alinement with the pointed upper ends of the underlying shingles, and the lower edges of the approximately rectangular portions being extended over the upper edges of the parallel side edges and so as to cover the space between adjacent triangular portions of the shingles in the next adjacent row below, the triangular body portions of the shingles of one row curved downward and resting upon the foundation at points intermediate of the triangular parts of the shingles of the next row below so as to interlock, and nails for nailing the shingles in pairs to the foundation.

5. In a roof, the combination of a suitable foundation, with a plurality of horizontal rows of shingles each composed of pliable fibrous material impregnated with hydrocarbon compound and having approximately one-third of its length of general rectangular form with parallel side edges and the remaining approximately two-thirds of the length in triangular form, said shingles arranged side by side in overlapping rows and with the vertical juncture spaces between the shingles of the adjacent rows in staggered relation and in vertical alinement with the pointed upper ends of the underlying shingles, and the lower edges of the approximately rectangular portions being extended over the upper edges of the parallel side edges and so as to cover the space between adjacent triangular portions of the shingles in the next adjacent row below, the triangular body portions of the shingles of one row being curved downward and resting upon the foundation at points intermediate of the triangular parts of the shingles of the next row below and the side parts of the general rectangular body portions of the shingles of the next row above being curved downward upon said downwardly curved triangular portions so that the shingles of the several rows interlock with shingles of the rows above and below, and nails for securing the shingles to the foundation.

6. In a roof, the combination of a suitable foundation, with a covering consisting of a series of horizontal rows of shingles each formed of felt paper impregated with hydrocarbon compound and coated with vitreous material and having said shingles made substantially rectangular at the bottom portion and triangular or pointed at the upper portion, the height of the upper portion being greatly in excess of the height of the lower portion said rows of shingles overlapping and the vertical spaces between adjacent shingles of one row being staggered with respect to the vertical spaces of the adjacent rows, the body portions of the overlapping shingles being curved downward so as to interlock laterally and vertically, and nails for securing the overlapping shingles to the foundation.

7. In a roof structure, the combination of a suitable foundation, with a covering of overlapping shingles cemented together under the normal action of the sun's rays and weather conditions, said covering consisting of a plurality of horizontal rows of shingles each shingle formed with one end pointed whereby that end is of greatly less surface area than the body of the remaining end of the shingle, and in which the lower portions of said shingles of one horizontal row overlap the vertical spaces between adjacent shingles of the next relatively lower row, and the body portions of the shingles at the upper ends bent downward toward the foundation, the bent portion thereof acting to secure the shingles in firm interengagement and the under surface of the shingles of one row cemented to the upper surfaces of the adjacent lower rows by the exudation of the hydrocarbon contents of the shingles, and nails driven through the shingles into the foundation for positioning the shingles when setting them in place upon the roof, the whole forming a light-weight roof covering and in which the shingles are automatically cemented into a continuous covering under the action of the weather elements.

8. In a roof, the combination of a suitable foundation, with a covering consisting of a series of overlapping horizontal rows of shingles each formed of felt paper impregnated with hydrocarbon and having a pliable body, said shingles made with one end portion of substantially rectangular shape and with the other end portion reduced in width, said end portions of relatively different lengths vertically considered, the lower portion of the shingles of said rows of shingles overlapping the vertical spaces between adjacent shingles of the next relatively lower row and said spaces of one row staggered with respect to similar vertical spaces between the shingles of adjacent rows, and the body portions of the shingles at the upper ends bent downward toward the foundation and acting to interlock the rows of shingles, and nails for securing the overlapping shingles to the foundation.

In testimony of which invention I hereunto set my hand this 4th day of April, 1914.

CALVIN RUSSELL.

Witnesses:
W. R. McCann,
Loren Eddy.